April 9, 1968  J. S. HILBUN  3,376,989
TRUCK BODY LOADER

Filed Aug. 8, 1966  4 Sheets-Sheet 1

INVENTOR
James S. Hilbun

BY
ATTORNEYS

April 9, 1968

J. S. HILBUN 3,376,989

TRUCK BODY LOADER

Filed Aug. 8, 1966

INVENTOR
James S. Hilbun
BY
ATTORNEY

April 9, 1968  J. S. HILBUN  3,376,989
TRUCK BODY LOADER

Filed Aug. 8, 1966  4 Sheets-Sheet 3

INVENTOR
James S. Hilbun
BY
ATTORNEY

April 9, 1968 J. S. HILBUN 3,376,989
TRUCK BODY LOADER
Filed Aug. 8, 1966
4 Sheets-Sheet 4
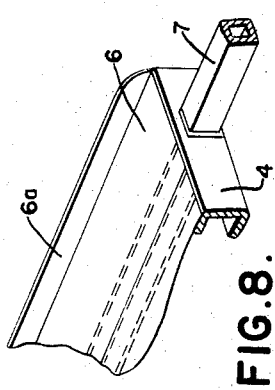
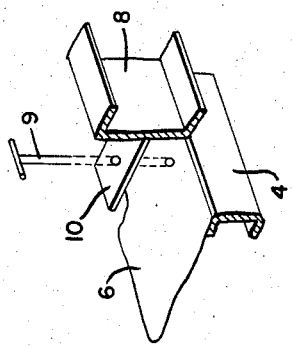
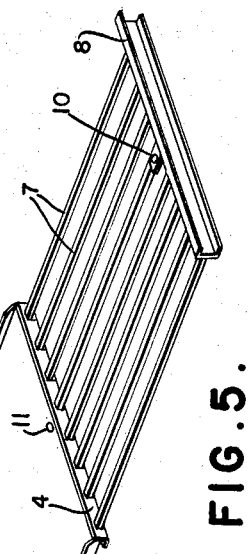
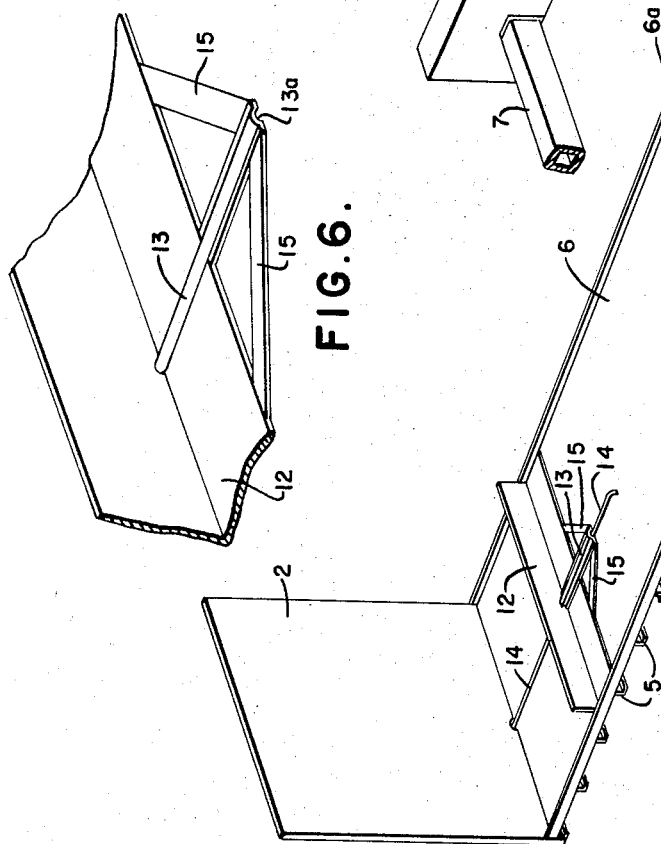
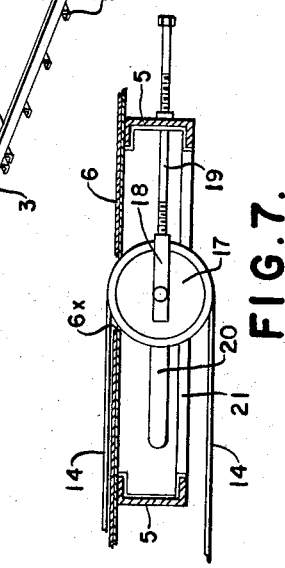
INVENTOR
James S. Hilbun
BY Alexander Howell
ATTORNEYS

United States Patent Office 3,376,989
Patented Apr. 9, 1968

3,376,989
TRUCK BODY LOADER
James S. Hilbun, P.O. Box 2266, Laurel, Miss. 39440
Filed Aug. 8, 1966, Ser. No. 571,025
11 Claims. (Cl. 214—517)

This invention is a novel mechanical means for simultaneously moving stacked empty chicken coops rearwardly upon a rearwardly extendable truck body in order to eliminate the customary step of initially manually unloading the two front rows of empty coops (usually 72 in number), in order that the truck body may be loaded with coops containing live birds as easily and quickly as possible.

Prior to my invention, the said two front rows of unfilled coops (72 in number) had to be initially unloaded manually and stacked on the ground adjacent the chicken house because the truck is always loaded from the front. Then the coops on the third row from the front of the truck were moved into the chicken house, loaded with live birds, then returned to the truck body, and then loaded into the empty space created by the removal of the two front rows of coops. When all of the coops on the truck body (excluding the initial front two rows) had been loaded and stacked back on the truck body, then the 72 coops which were unloaded initially and placed on the ground, must be moved manually into the chicken house for loading with live birds, and then replaced onto the rear end of the truck body. The foregoing is the procedure presently in customary use throughout the poultry industry today.

According to my invention, a truck loaded with empty chicken coops is moved to a position adjacent the chicken house. When the coop moving mechanism is actuated, it initially pushes the entire load of empty coops rearwardly about six feet from the front wall of the truck body. As the load is being pushed back, it catches a lip on the back of the rearwardly extendable portion of the truck body which causes the latter to also shift rearwardly about six feet in order to provide an empty space at the front of the truck body between the front wall and the first row of empty coops in which two rows of loaded coops may then be placed. At the starting position for loading the empty coops of the first row of the shifted coops are then moved into the chicken house by a conventional conveyor. The loaded coops are then returned to the truck body by a second conventional conveyor and stacked into the empty space formed by the shifted empty coops. It can readily be seen that as the front space (two rows) is filled, two more rows are left empty. When the loading of the truck body is thus nearly completed, the last two rows of empty coops remain on the extended portion of the truck body, and when these two rows are loaded and placed in position on the rear end of the main truck floor, the extended portion has served its purpose, and the extended portion is then pushed back into normal position within the truck body. The load of birds is then ready for binding and transporting.

My invention will thus save approximately five man hours in the loading of each truck with filled chicken coops. This eliminates the necessity of the chicken catching crew from having to come out of the bird house to initially unload the front two rows of empty coops. It also eliminates the necessity of this same crew of workers from having to come out of the house near the end of each loading operation to manually move these front two rows of coops into the chicken house for loading and for then replacing the coops onto the truck body.

I will explain the invention with reference to the accompanying drawings which illustrate one practical embodiment thereof, to enable others familiar with the art to adopt and use the same; and will summarize in the claims the novel features of construction, and novel combinations of parts, for which protection is desired.

In said drawings:

FIG. 5 is a perspective view of the unloaded truck body showing the pusher bar which moves the stacks of empty chicken coops in its rearward position, and showing the rear end of the truck body extended rearwardly by the stacks of coops.

FIG. 6 is an enlarged perspective view of a portion of the pusher shown in FIG. 5, detached.

FIG. 7 is a vertical section through a portion of the means for moving the pusher bar.

FIG. 8 is an enlarged perspective detail of the rear end of the truck main body adjacent a corner thereof.

FIG. 9 is an enlarged perspective view of a portion of the body extension, detached.

FIG. 10 is an enlarged perspective view of the means for locking the extension member to the rear end of the main truck body.

Figure 1:
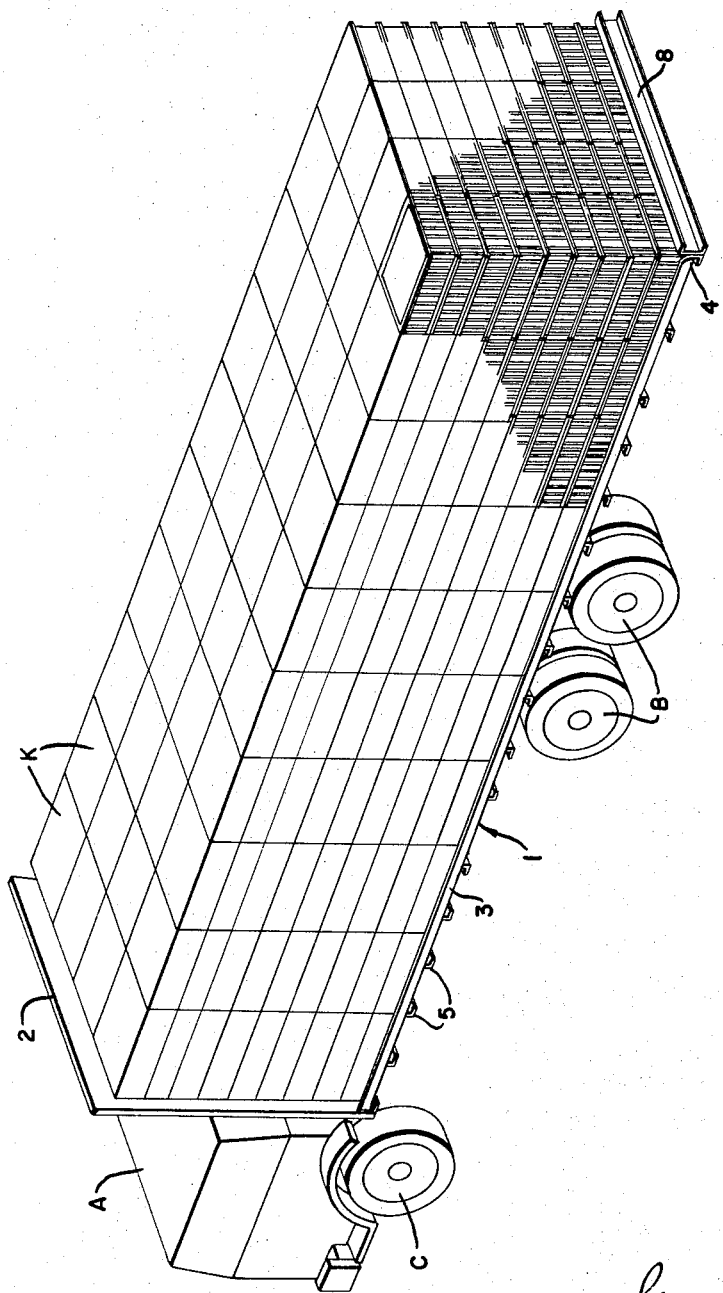
FIG. 1 is a perspective view of a truck body loaded with empty chicken coops, prior to actuation of the body extension mechanism.

As shown in the drawings, the truck chassis is of conventional form having a cab A at the forward end thereof, and having rear driving wheels B and front steering wheels C in the usual manner. Upon the truck chassis is a flat body 1 having at its forward end adjacent the rear of the cab A a vertical wall 2 which is fixed with respect to the body. In the drawings the body is shown as of width to accommodate rows of four stacks of chicken coops K disposed end-to-end, and of length to accommodate ten stacks of coops K disposed side-to-side. However, the specific number of stacks or rows of coops forms no part of my present invention.

As shown, the body 1 comprises a floor frame formed of side angle bars 3 at the sides of the body respectively, connected at their front and rear ends by transverse channel bars 4, the side bars 3 being further connected together by a series of spaced transverse channel bars 5 extending between the side bars 3. A floor plate 6 covers the top of the floor frame 3, 4, 5 to form a smooth floor surface for the body extending from the base of the vertical wall 2 to the rear channel bar 4. Preferably the sides of the floor plate 6 at each side of the body 1 are turned upwardly as at 6a to prevent the rows of coops K from sliding laterally off the floor plate 6 during transportation of the coops.

Figure 2:
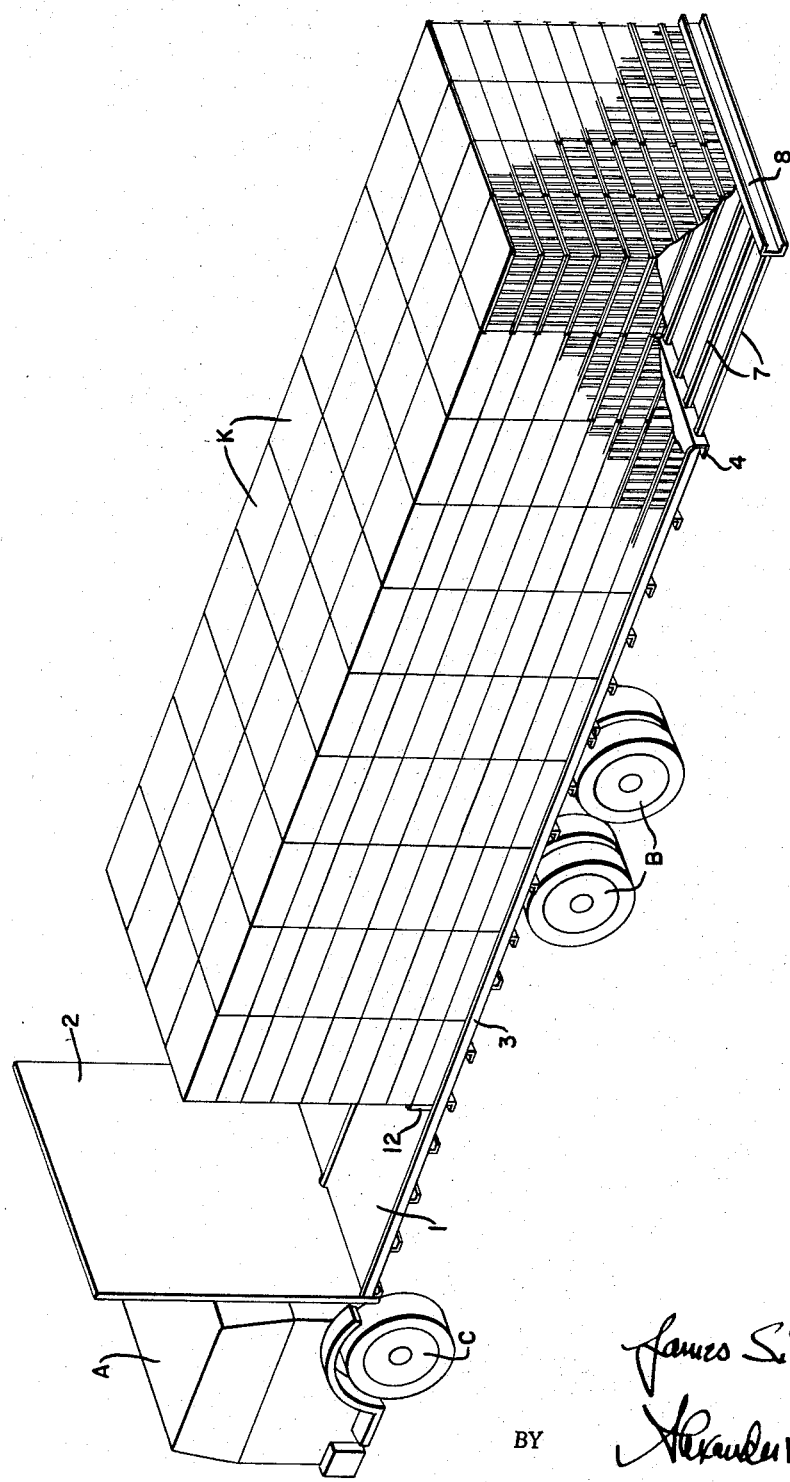
FIG. 2 is a perspective view of the truck body shown in FIG. 1 after the body has been extended rearwardly to provide a space between the front wall of the truck body and the empty coops in which two rows of loaded coops may then be placed.
Figure 3:
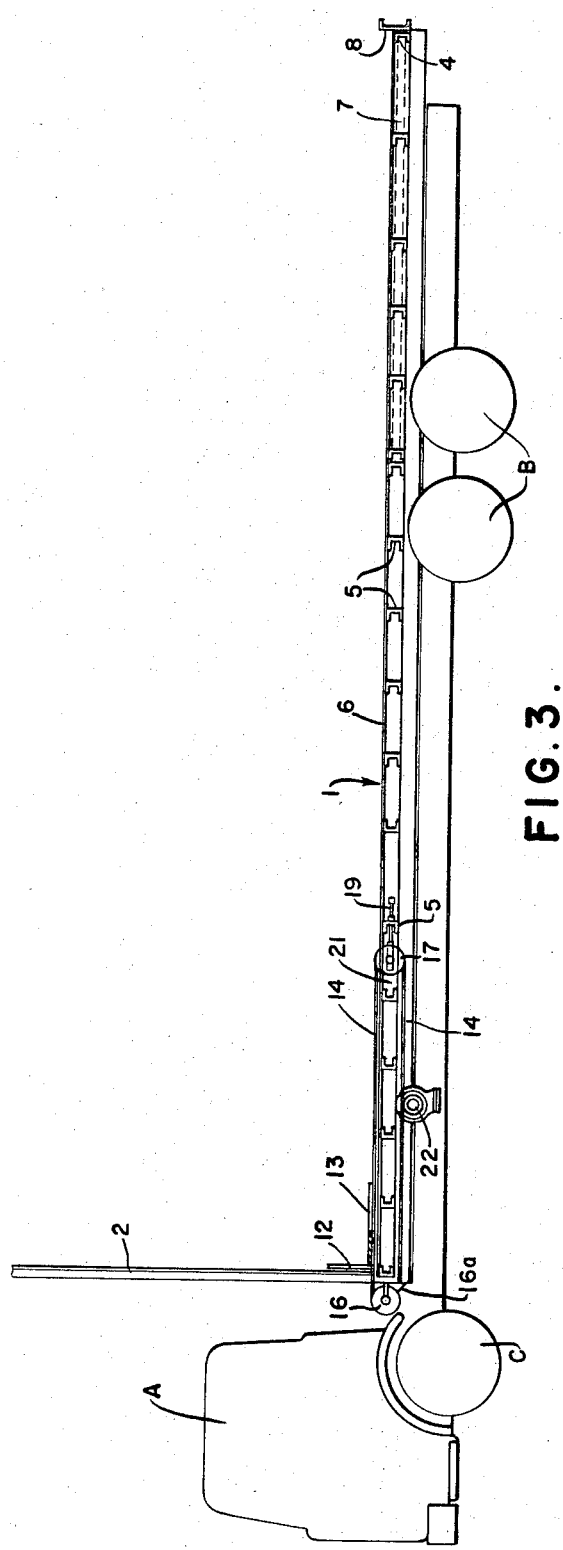
FIG. 3 is a side elevation of the truck body shown in FIG. 1 when unloaded.

At the rear end of the body 1 is a rearwardly extensible floor frame comprising a longitudinal series of tubes 7, preferably of square cross-section, which slidably extend through correspondingly shaped holes therefor in the rear channel bar 4 of the body 1, as shown in FIGS. 3, 4, 5, and 8, the tubes 7 also slidably passing through correspondingly shaped holes in the transverse channel bars 5 at the rear portion of the body 1, the outer ends of the tubes 7 being connected by a channel bar 8, the upper end of which extends above the plane of the floor plate 6, as shown in FIG. 3. By this construction the extension frame 7–8 may be pushed forwardly so that the channel bar 8 thereof contacts the rear face of the rear channel bar 4, as shown in FIGS. 1, 3, 4 and 10, or the extension frame may be pulled rearwardly as shown in FIGS. 2, 5 and 8 to support two rows of chicken coops K as shown in FIG. 2, the extension frame forming a continuation of the rear end of the body.

In order to lock the extension frame in non-extended position, a locking pin 9, FIG. 10, may be used, the same passing through a perforated plate 10, FIG. 10, extending from center of the front face of the channel 8, the free end of the pin engaging a hole 11 therefor provided at the center of the rear end of the floor plate 6, whereby when the pin 9 is engaged, as shown in FIG. 10, the extension frame will be prevented from rearward movement with respect to the rear channel member 4 of the body 1.

Means are provided for shifting the stacked coops K on the truck body 1 from the normal position shown in FIG. 1 to the moved position shown in FIG. 2, said shifting means simultaneously extending the extension frame 7–8 when the pin 9 has been removed to leave an open space approximately equal to two transverse rows of coops K between the forward end of the stack and the upright wall 2, the two rearmost rows of chicken coops K being then supported upon the tubes 7 of the extension frame 7–8. As shown in FIGS. 3, 4, 5, 6 and 7, said means comprises an angle-shaped pusher bar 12 of length to fit between the flanges 6a of the floor plate 6, the pusher bar 12 being longitudinally slidable upon said floor, and the pusher 12 normally having its vertical leg contacting the upright wall 2, and its horizontal leg engaging the top of the floor plate 6 of the body. At the center of the pusher 12 is fixed an axially disposed member 13 having a semi-circular recess 13a in its lower face for receiving a cable 14 which actuates the pusher bar 12 for movement towards or from the upright wall 2. Preferably the outer end of the member 13 is reinforced by flat struts 15 which are adapted to slide upon the floor plate 6.

At the front end of the body 1, in front of the vertical wall 2, is a fixed pulley 16 (FIGS. 3 and 4) mounted in a suitable bracket 16a, the upper periphery of the pulley 16 being substantially flush with the upper surface of the floor plate 6, and the pulley being disposed on the longitudinal axis of the floor plate 6. An adjustable pulley 17 is mounted in an adjustable slide 18 (FIG. 7) the upper periphery of which extends through an opening 6x (FIG. 7) in the floor plate 6 in rear of the pusher 12, the upper surface of the pulley 17 being substantially flush with the floor plate 6, the cable 14 running around the pulleys 16–17.

As shown in FIG. 7, the adjustable slide 18 is longitudinally adjustable with respect to the fixed pulley 16 by means of a threaded rod 19 passing through a tapped hole in the channel 5 of the floor immediately in rear of the pulley 17, whereby rotation of the threaded rod 19 will shift the adjustable pulley with respect to the fixed pulley 16 to take up any slack in the cable 14. Preferably the ends of the shaft of the adjustable pulley 17 pass through bearings therefor in the slide 18 and also engage longitudinal slots 20, FIG. 7, in plates 21 disposed at both sides of the adjustable pulley 17 to prevent lateral tilting of the adjustable pulley 17 when the slide 18 is adjusted by rotating the threaded rod 19.

The pusher bar 12 is secured to the upper run of the cable 14, which cable runs around a pulley on a reversible motor 22 (FIG. 3) mounted on the underside of the body 1 and which is controlled from the cab A of the truck, whereby actuation of the motor 22 will cause the pusher 12 to move rearwardly or forwardly with respect to the upright wall 2.

In operation, the truck loaded with empty chicken coops K, as shown in FIG. 1, is moved to a position adjacent the desired chicken house. The truck operator then from the cab A actuates the motor 22 in a direction to move the pusher 12 from its normal position against the upright wall 2 into the position shown in FIGS. 2 and 5, the truck operator having first removed the pin 9 which holds the extensible floor 7–8 locked against the end of the main body 1. Such movement of the pusher bar 12 will provide a space, between the first row of empty coops, FIG. 2, and the upright wall 2, approximately equal to two longitudinal rows of coops K. The shifting of the entire load of empty coops K rearwardly by the pusher bar 12 will simultaneously cause the body extension 7–8 to shift from the position shown in FIG. 1 to that shown in FIGS. 2 and 5, the rearmost row of coops K on the truck engaging the upwardly projecting position of the channel 8 of the extension frame 7–8, so that the load of empty chicken coops K assumes the position shown in FIG. 2 to provide a space at the front of the truck body on which two rows of loaded coops may then be placed.

Figure 4:
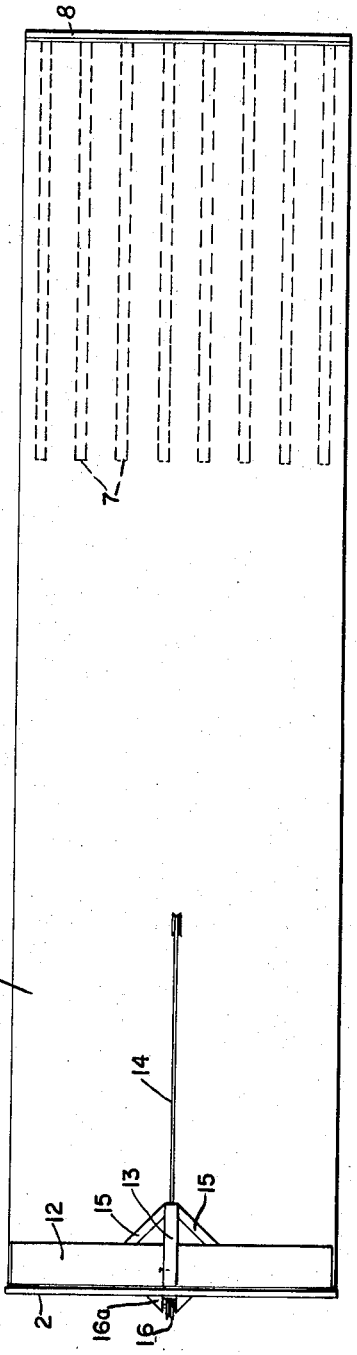
FIG. 4 is a top plan view of the unloaded truck body shown in FIG. 3.

The motor 22 is then actuated by controls in the cab A to restore the pusher 12 to its normal position against the upright wall 2, as shown in FIGS. 3 and 4. At the starting position for loading shown in FIG. 2, the empty coops K of the front row are moved into the chicken house preferably by a conventional conveyor, and the loaded coops K are then returned to the truck body by another conventional conveyor and stacked into the empty space formed between the upright wall 2 and the foremost row of empty coops K. This operation is continued step-by-step and it can be readily seen that as the two row empty front space is filled two more rows are left empty. As the truck body becomes nearly completely loaded the last two rows of empty coops are still disposed on the extended portion 7–8 of the truck body, but when they are loaded and placed in position on the rear end of the main truck body 11, all loaded coops will rest upon the main body 1 of the truck and none will rest on the extension 7–8, and the extended portion 7–8 will then have served its purpose. Thereafter the extended portion 7–8 may be pushed back manually against the body 1, and the load of filled coops K is ready for binding and for transporting.

Prior to my above invention, the front two rows of coops (72 in number) had to be unloaded manually and stacked on the ground. This is because the truck is always loaded from the front. Then the coops on the third row were moved into the house, loaded with live birds, returned to the truck body, and loaded into the empty space created by the moving of the two front rows of coops. When all of the remaining coops on the truck body had been loaded and stacked back on the body, then the 72 coops which were unloaded initially and placed on the ground, had to be moved manually into the chicken house for loading with live birds, and then moved back onto the truck body. This is the method presently in use throughout the poultry industry today.

My new method will save approximately five man hours in the loading of each truck with broilers. This eliminates the chicken catching crew from having to initially come out of the chicken house to unload the front two rows of coops. It also eliminates this same crew of workers from having to come out of the house near the end of each loading operation to manually move these first two rows of coops into the house for loading and then replacing same onto the truck body.

I do not limit my invention to the exact form shown in the drawings, for obviously changes may be made therein within the scope of the claims.

I claim:

1. In combination with a truck chassis; a main truck floor on said chassis; a vertical wall at the front end of said floor; said floor being of width to receive rows of stacked chicken coops or the like disposed end-to-end and being of length to receive rows of said coops disposed side-by-side; an extensible floor at the rear end of said main floor forming a continuation thereof when extended and adapted to receive several of the rearmost longitudinal rows of coops when the entire load of coops on the main floor is moved rearwardly; and means on the main floor for moving the entire load of coops thereon rearwardly to provide a space equal to said several longitudinal rows of stacks between the vertical wall and the foremost row of stacked coops, the rear end of said load of coops engaging the extensible floor and simultaneously extending same rearwardly as the load is moved.

2. In a combination as set forth in claim 1, said main floor comprising side bars, transverse bars connecting the ends of said side bars; a series of intermediate transverse bars connecting the side bars, a plate covering said bars; and said extensible frame comprising a series of tubes slidably extending through correspondingly shaped holes through the rear transverse bar of the main floor and through the series of intermediate bars; and a second transverse bar connecting the rear ends of said tubes, the upper end of the second transverse bar extending above the main floor to engage the rear end of the load of coops on the main floor.

3. In a combination as set forth in claim 1, said load moving means comprising an exially disposed fixed pulley journaled at the front end of the main floor in advance of the vertical wall, the upper periphery of said pulley being flush with the floor; an adjustable pulley aligned with said fixed pulley and journaled in axially adjustable bearings, the upper periphery of the adjustable pulley extending through an opening in the floor plate and being flush with the floor; a reversible prime mover having a drum aligned with the fixed and adjustable pulleys; a cable running around said pulleys and drum; and a pusher bar disposed transversely on said floor and connected to the upper run of said cable and adapted to engage the foremost longitudinal rows of coops on said main floor.

4. In a combination as set forth in claim 3, said pusher bar comprising an angle bar, the vertical leg of which normally contacts the lower end of the vertical wall an engages the lower front portion of the foremost row of coops; an axially disposed member on said pusher bar having an axial groove in its lower face receiving the said cable; and struts on the bar reinforcing the rear end of the said member.

5. In a combination as set forth in claim 3, said adjustable bearings for the adjustable pulley comprising a pair of fixed vertical plates receiving therebetween the adjustable pulley; a slide in which the adjustable pulley is journaled, said adjustable pulley having stub shafts engaging bearings in the slide and engaging slots in said pair of plates; and a threaded rod extending through a fixed member of the truck body and rotatably connected to the slide for shifting the adjustable pulley in said slots.

6. In combination with a wheeled truck chassis; a main truck floor on said chassis; a vertical wall at the front end of said floor; said floor being of width to receive rows of stacked chicken coops or the like disposed end-to-end and being of length to receive rows of said coops disposed side-by-side; and extensible floor at the rear end of said main floor forming a continuation thereof when extended and adapted to receive several of the rearmost longitudinal rows of coops when the entire load of coops on the main floor is moved rearwardly; means for locking the extensible floor in normal unextended position; and means on the main floor for moving the entire load of coops thereon rearwardly to provide a space equal to said several longitudinal rows of stacks between the vertical wall and the foremost row of stacked coops, the rear end of said load of coops engaging the extensible floor and simultaneously extending same rearwardly as the load is moved.

7. In a combination as set forth in claim 6, said main floor comprising side bars, transverse bars connecting the ends of said side bars; a series of intermediate transverse bars connecting the side bars, a plate covering said bars, said plate having upwardly extending flanges at its side edges; and said extensible frame comprising a series of tubes slidably extending through correspondingly shaped holes through the rear transverse bar of the main floor and through the series of intermediate bars; and a second transverse bar connecting the rear ends of said tubes, the upper end of the second transverse bar extending above the main floor to engage the rear end of the load of coops on the main floor.

8. In a combination as set forth in claim 6, said locking means comprising a perforated plate extending forwardly from the center of the second transverse bar and disposed above the main floor; and a pin passing through said plate and into a hole thereunder in the floor plate.

9. In a combination as set forth in claim 6, said load moving means comprising an axially disposed fixed pulley journaled at the front end of the main floor in advance of the vertical wall, the upper periphery of said pulley being flush with the floor, an adjustable pulley aligned with said fixed pulley and journaled in axially adjustable bearings, the upper periphery of the adjustable pulley extending through an opening in the floor plate and being flush with the floor; a reversible prime mover having a drum aligned with the fixed and adjustable pulleys; a cable running around said pulleys and drum; and a pusher bar disposed transversely on said floor and connected to the upper run of said cable and adapted to engage the foremost longitudinal rows of coops on said main floor.

10. In a combination as set forth in claim 9, said pusher bar comprising an angle bar, the vertical leg of which normally contacts the lower end of the vertical wall and engages the lower front portion of the foremost row of coops; an axially disposed member on said pusher bar having an axial groove in its lower face receiving the said cable; and struts on the bar reinforcing the rear end of the said member.

11. In a combination as set forth in claim 9, said adjustable bearings for the adjustable pulley comprising a pair of fixed vertical plates receiving therebetween the adjustable pulley; a slide in which the adjustable pulley is journaled, said adjustable pulley having stub shafts engaging bearings in the slide and engaging slots in said pair of plates, and a threaded rod extending through a fixed member of the truck body and rotatably connected to the slide for shifting the adjustable pulley in said slots.

References Cited
UNITED STATES PATENTS 3,004,790  10/1961  Mayer _____ 214—83.24 XR
3,333,715  8/1967  Hepburn et al. __ 214—83.22 XR GERALD M. FORLENZA, Primary Examiner.

A. J. MAKAY, Examiner.